Dec. 11, 1956 J. H. STEPHENS 2,773,918
SOLVENT EXTRACTION PROCESS
Filed Jan. 7, 1952

INVENTOR:
JOHN H. STEPHENS
BY: Chester J. Giuliani
Donald E. Moehling
ATTORNEYS

United States Patent Office 2,773,918  
Patented Dec. 11, 1956

2,773,918
SOLVENT EXTRACTION PROCESS

John H. Stephens, Brookfield, Ill., assignor to Universal Oil Products Company, Chicago, Ill., a corporation of Delaware Application January 7, 1952, Serial No. 265,242

3 Claims. (Cl. 260—674)

This invention relates to an improvement in the process of solvent extraction whereby more efficient utilization of heat supplied to the process may be obtained and a substantial economy in heat required in the process thereby effected. More specifically, the invention concerns an improved solvent extraction process for the separation of at least one component of a feed stock mixture, utilizing a selective solvent comprising a mixture of primary and secondary solvent constituents, said secondary solvent boiling at a temperature below the primary solvent and being soluble therewith, but having the tendency to reduce the solubility of raffinate components of the feed stock mixture in the solvent, said improvement of which comprises vaporizing the extracted feed stock component from the fat solvent stream in a solvent stripping zone with at least a portion of the more volatile secondary solvent constituent, passing said secondary solvent in indirect heat exchange relationship with either the fat or lean solvent stream in an amount sufficient to convert said solvent into vapors of greater heat content and introducing the resulting vapor into said stripping zone to further remove extracted feed stock component from the residue of the fat solvent stream in the stripping zone.

A more specific embodiment of the invention concerns an improvement in a solvent extraction process for separating at least one component of relatively greater polarity from a mixture of organic compounds of varying degrees of polarity wherein said mixture is contacted in a solvent extraction zone with a selective solvent comprising a solution of primary and secondary solvent constituents to form a fat solvent stream and a raffinate stream, said primary solvent being soluble with and less volatile than said component of greatest polarity and said secondary solvent boiling at a temperature below said primary solvent, the improvement which comprises vaporizing dissolved component of greatest polarity and secondary solvent from said fat solvent stream in a solvent stripping zone thereby forming a lean solvent residue, recovering secondary solvent from the resulting vapors, passing at least a portion of the recovered secondary solvent in indirect heat exchange relationship with at least one of said aforementioned fat solvent and lean solvent streams forming thereby secondary solvent vapors of greater heat content, and passing said last mentioned secondary solvent vapors into said solvent stripping zone.

This invention is broadly concerned with a solvent extraction process, preferably utilizing a countercurrent flow arrangement for contacting the solvent and feed stock wherein the feed stock comprises a mixture of organic compounds of varying polarity and the extractant is a selective solvent comprising a mixture of primary and secondary solvent constituents having the aforementioned solubility and volatility characteristics. A fat solvent or extract stream containing dissolved therein one or more of the relatively polar components of the feed stock mixture selectively soluble in the solvent is withdrawn from one end of the extraction zone while a raffinate stream comprising residual, non-extracted components of the feed stock mixture is removed from the extraction zone at the opposite end thereof. The fat solvent stream is charged, preferably at a temperature and pressure somewhat below the corresponding conditions maintained in the extraction zone into a solvent stripping zone, thereby obtaining flash vaporization of at least a portion of the relatively volatile components of the fat solvent stream.

During the operation of the extraction stage of the process the selective solvent is maintained at a certain composition representing a preferred proportion of primary and secondary solvent constituents. The composition is preferably such that the more volatile secondary solvent may be subsequently vaporized in sufficient quantity from the fat solvent stream to provide a sufficient volume of secondary solvent vapors to strip substantially all of the extracted component or components from the fat solvent and more particularly from the fat solvent stripper bottoms in the reboiler section of the stripping zone. The quantity of secondary solvent vapors required to effect substantially complete stripping of the fat solvent and substantially complete recovery of the desired relatively polar component of the feed stock mixture from the fat solvent is considerable and requires a selective solvent composition likewise containing a considerable proportion of the secondary solvent constituent therein, generally from about 2 to about 35% by weight of the selective solvent mixture.

It is a general requirement of such solvent extraction systems that the lean solvent residue from which the extracted component has been largely vaporized in the bottom portion of the stripping zone (that is, the so-called "stripper bottoms"), must be heated to approximately the boiling point of the solvent composition at this point in the stripping column in order to remove the last traces of extracted feed stock component from the fat solvent stream. That such is common experience in the operation of solvent stripping columns utilizing commonly employed solvents is well known in the extraction art and does not here require further elaboration. The stripping column is accordingly ordinarily equipped with a reboiling section in its lowest portion to accomplish the necessary heating of the stripper bottoms to the boiling point of the latter composition just prior to removal of the resulting lean solvent from the stripping column. Since the secondary solvent constituent of the selective solvent is a compound having a boiling point below the boiling point of the primary solvent, a large proportion of the secondary solvent constituent is generally vaporized from the fat solvent stream before the extracted component is completely stripped therefrom; it is, in fact, the vaporization of at least a portion of the secondary solvent from the fat solvent stream and/or the passage of secondary solvent vapor through the latter stream which enables the dissolved, extracted, component to be substantially completely recovered therefrom. The boiling point of the fat solvent residue at this point may be correspondingly higher due to the removal of the relatively volatile secondary solvent constituent therefrom. Under such conditions it becomes essential to supply a relatively large quantity of heat to the stripper bottoms by means of the reboiler coil in order to remove therefrom substantially all of the extracted polar component of the feed stock dissolved therein. In the present method of operating the stripping column wherein vaporized secondary solvent is charged into the lower portion of the stripping column, the fat solvents residue in contact with the reboiler coil is maintained at a relatively low boiling point by replenishing the secondary solvent constituent in the fat solvent residue substantially as rapidly as it is removed by vaporization therefrom with the aid of heat supplied by the reboiling coil. Thus, by maintaining the proportion of the relatively volatile secondary solvent constituent in the lean solvent at its point of contact with the reboiling coil at a value at which the lean solvent boils at a relatively low temperature, vaporization of the secondary solvent therefrom and the resulting stripping is accomplished at a lower temperature and with less heat input into the reboiling coil. Where stripping is effected by boiling the secondary solvent constituent from the stripper bottoms, the vaporization of the latter absorbs heat from the reboiler coil and requires all of the heat requried by the system to be supplied from external sources. On the other hand, where stripping is effected in accordance with the process of the present invention, the heat required for volatilization of the residual aromatic hydrocarbon(s) in the stripper bottoms is derived from the secondary solvent vapors which in turn are vaporized by heat extracted from either the fat or lean solvent stream, relieving the reboiler heating duty to that extent.

In order to eliminate large cooling and heating duties on the process as the lean solvent is continuously recycled from the stripping column to the extraction column and thereafter (as the fat solvent stream), again charged into the stripping column, the stream of hot stripper bottoms is desirably maintained at the selective solvent composition suitable for the extraction stage of the process and is transferred directly to the extraction column at substantially the same temperature as the lean solvent or stripper bottoms stream, thereby eliminating any heating or cooling between the stripping and extraction stages of the process. By introducing the secondary solvent into the lower portion of the stripping column in contact with the lean solvent just prior to removal of the latter from the stripping column and recycling of the same to the solvent extraction zone, the lean solvent stream is maintained at its selective composition suitable for the extraction stage of the process and at the temperature suitable for solvent extraction.

In accordance with the principal operating feature of the present extraction process, the secondary solvent introduced into the solvent stripping colunm to effect stripping of the residue of dissolved polar feed stock component from the fat solvent stream is converted into vapors of relatively greater heat content by indirect heat excharge with either the lean solvent stream (that is, the hot stripper bottoms from the stripping zone) or with the fat solvent stream from the extraction column and is thereafter charged as hot secondary solvent vapors into the stripping column, preferably into the lower portion of the column above the reboiling section. In this manner a large portion of the heat required to effect stripping of the residue of polar feed stock component from the fat solvent is thereby supplied from the hot secondary solvent vapors.

A preferred source of the secondary solvent for conversion into the hot vapors supplied to the stripping zone is the condensed vapors of the solvent removed from the stripping zone as the light overhead vapors therefrom. In the method of generating hot secondary solvent vapors by passing the condensed secondary solvent overhead from the stripping zone in heat exchange relationship with the fat solvent stream removed from the extraction zone, the secondary solvent in effect removes excess heat contained in the fat solvent stream and generates hot secondary solvent vapors recycled to the stripping zone. The removal of heat from the fat solvent stream and the transfer of this heat to the recycled secondary solvent as latent heat of vaporization results in a net reduction in temperature of the fat solvent stream to a value sufficient to obtain the initial flash distillation in the stripping zone of the volatile components present in the stream. The recycling of the hot secondary solvent vapors of greater heat content into the lower portion of the stripping zone re-introduces the heat into the stripping zone at a point in the stripping zone where heat is required to effect the removal of the remaining polar feed stock component dissolved in the fat solvent residue. The net effect of such operation is to more efficiently utilize the heat supplied to the present combined extraction-stripping process and to relieve the reboiler of at least a portion of its heating duty ordinarily required in the absence of the present secondary solvent heat exchange operation to vaporize the remaining dissolved, polar feed stock component from the fat solvent.

In the alternative heat exchange operation herein provided, wherein the hot lean solvent or stripper bottoms stream is passed in indirect heat exchange relationship with the recycled secondary solvent to generate the secondary solvent vapors charged into the lower portion of the stripping zone to effect the desired stripping operation, the heat required to convert the secondary solvent stream into vapors thereof is removed from the stripper bottoms, resulting in a reduction in the temperature of the stream prior to its recycling as lean solvent to the extraction zone. The heat exchange thus reduces the temperature at which the solvent extraction zone is operated. This type of operation may be particularly desirable when the selective solvent contains a lower proportion of the secondary solvent component therein, increasing its capacity to dissolve the relatively polar component of the feed stock mixture, while maintaining its selectivity at the desired level at the lower temperature.

In either system of heat exchange a substantially isothermally operated extraction-stripping process is provided which is particularly advantageous from the standpoint of economy in operation since large scale heating and cooling is eliminated and the equipment required therefor is obviated. Furthermore, the selective solvent composition is substantially as effective (that is, is as capable of dissolving the desired polar feed stock component without any substantial sacrifice in selectivity) at high solvent temperatures as it is at substantially lower extraction temperatures for most selective solvent compositions.

The recycling of the secondary solvent vapors into the lower portion of the stripping column wherein the vapors effect stripping of the fat solvent residue therein, accomplishes this desirable effect essentially by reduction in the partial pressure of the selectively dissolved, polar feed stock component in the fat solvent and, in effect, supplies the heat of vaporization required to strip the remaining dissolved feed stock component from the solvent, without correspondingly increasing the heating duty on the reboiler supplying the stripping column with heat. The economy in heat realized by operating the process in accordance with the present improved heat exchange provisions, an operation in which the recovery of at least 90%, and generally greater than about 95%, of the desired polar component of the feed stock mixture is possible, results in a saving of approximately 30%, up to about 60% of the total heat required to effect the separation of the product by procedures heretofore employed in which the present heat exchange improvement is omitted.

The solubility of a particular organic compound or group of compounds of an organic feed stock mixture in a solvent, and hence, the extractability thereof from other components of the mixture is, in general, correlated with the polarity of the feed stock components. From the standpoint of both quantity and purity, the recovery of a particular desired component from the feed stock mixture depends upon the relative degree of polarity of the desired component to be recovered with respect to other components of the mixture comprising the feed stock. Polarity of an organic compound is the result of electromeric displacements within the structure of the compound, resulting in the activation of certain bonds in the molecule. It is characterized by the relatively greater tendency of more polar components to associate or to undergo reaction with other compounds to form complexes, and generally accompanies the presence of one or more electronegative radicals in the structure of the compound, although the presence of the electronegative substituents in the molecule is not necessarily a prerequisite for the compound to be relatively polar with respect to other compounds, as illustrated in the case of the relatively polar aromatic hydrocarbons which are readily separable from other hydrocarbon types by solvent extraction. In the case of liquid-liquid solvent extraction, the component of the mixture having the greatest polarity is believed to associate itself with the solvent in a more stable combination than with other less polar and less readily extracted components of the feed stock mixture.

Mixtures of organic compounds suitable as charging stocks in the present separation process contain at least one component which is relatively more polar than other components of the mixture. Thus, phenol and/or thiophene, containing the polar groups respectively [—OH] and [—SH], are separable from hydrocarbons such as benzene, although benzene is relatively more polar than a paraffinic or naphthenic hydrocarbon and may, itself, be extracted from mixtures thereof with the latter hydrocarbons. Likewise, mercaptans and alkyl sulfides which contain the relatively polar sulfhydryl [—SH] group may be extracted from hydrocarbon fractions. Compounds containing mono-carboxylic, mono-nitro, mono-amino, mono-sulfo, mono-hydroxyl, and other electronegative groups may be recovered from hydrocarbons or from symmetrical di-substituted compounds wherein no electromeric shift occurs due to a balance of electrical forces within the molecule. The occurrence of unsaturated bonds between carbon atoms or between carbon and oxygen or other elements gives rise to polarization, unless the electrometric shift is balanced by a tendency to shift in the opposing direction. Thus, mono-olefins, and particularly cyclo-olefins, are separable from paraffins; aromatic hydrocarbons are separable from olefins; and polycyclic aromatics are separable from benzenoid aromatic hydrocarbons. In each instance when specified herein, the component which is separable from the remaining components in the feed stock mixture is designated as a compound of relatively greater solubility in the selective solvent while the non-extracted residue comprises members having less polarity and, hence, are of lesser solubility in said solvent than the extracted compound. In the case of hydrocarbon mixtures comprising components of different structural classes, the solubility of the components in the present selective solvents decreases in the general order: aromatic, cyclo-olefinic, naphthenic, branched chain olefinic containing fewer than eight carbon atoms per molecule, aliphatic olefinic, including branched chain olefinic containing more than seven carbon atoms per molecule, and aliphatic paraffinic hydrocarbons. Thus, any member in the forepart of the series may generally be separated from any succeeding member of the series, utilizing the present selective solvent and extraction procedure. In any individual class of hydrocarbons, the solubility in the solvent in general decreases as the molecular weight of the compound increases, except that polycyclic aromatics are generally more soluble in the solvent than an aromatic hydrocarbon of the benzenoid series, the solubility of mono- and polyalkyl-substituted aromatics being less than the unsubstituted analogs. The feed stock in the present separation process may also consist of a mixture of one or more structural classes of hydrocarbons, the component to be separated having preferential or selective miscibility in the solvent relative to other components of the mixture. It is generally characteristic of the present solvents that they usually dissolve more readily those hydrocarbons characterized as "unsaturated," including aromatic as well as olefinic types of unsaturation than the saturated hydrocarbons of the same molecular weight, although in the case of olefinic hydrocarbons, the relatively high molecular weight straight chain members of this type containing more than about seven carbon atoms per molecule are characteristically more paraffinic in properties with respect to their solubility in the present solvent extractant than olefinic. The lower molecular weight olefinic hydrocarbons containing fewer than about eight carbon atoms per molecule, branched chain, and cyclo-olefins, on the other hand, are typically unsaturated hydrocarbons and are selectively extracted with the present solvent from aliphatic hydrocarbons contained in the feed stock.

Typical hydrocarbon mixtures utilizable as one class of charging stock in the present process include distillate fractions of catalytically cracked naphthas, specific boiling range fractions of natural or straight-run petroleum distillates, and especially certain reformed or hydroformed naphthas which are generally relatively rich in aromatic hydrocarbons and are particularly valuable as a source of extracted benzene, toluene and xylene. It is to be emphasized that although the process is applicable to the simultaneous extraction of more than one type of hydrocarbon from feed stocks containing more than one specie of the relatively more readily extracted hydrocarbons therein, such as aromatics and cyclo-olefins, the process is particularly adapted to the extraction of one type of hydrocarbon individually, such as the aromatic component of a hydrocarbon mixture, by selecting the boiling range of the feed stock and by adjusting the operating conditions most advantageous for the extraction of the particular class of hydrocarbon desired. One of the outstanding and particularly useful applications of the present method of separation, providing a means of resolving a mixture of components not readily separable into its constituent components by customary methods of separation, as for example, by fractional distillation, is the separation of an azeotropic mixture of hydrocarbons, such as a $C_6$ fraction of a petroleum distillate containing benzene, hexane and heptane isomers or a toluene-heptane-octane mixture. Such azeotropes boil over a considerable range of temperatures and contain varying proportions of the aromatic hydrocarbon constituent.

The selective solvent-extractant employed in the present separation process may be a single-component liquid of essentially pure primary solvent, a mixture of two primary solvent constituents, one of which boils at a substantially lower temperature than the other component, or a mixture of primary and secondary solvent constituents, which mixture has a selective solubility with the more polar component or components of the feed stock. The primary solvent, if utilized individually in an extraction system, tends to dissolve undesired components of the mixture as well as the desired more polar component, hence complicating the separation of a pure product in the subsequent solvent stripping operation. By mixing a suitable proportion of the secondary solvent constituent with the primary solvent, however, a selective solvent may be provided which is selectively soluble with only the desired relatively polar component of the feed stock mixture. The solvent constituent herein referred to as the "secondary solvent" is a compound having a lower boiling point than the primary solvent, is soluble in the primary solvent but substantially insoluble with the feed stock mixture, (thereby increasing the selectivity of the mixture of the solvents) is stable at its boiling point such that it may be readily distilled from the fat solvent or extract phase produced in the extraction stage of the present process, and desirably boils at a temperature above or below the extracted component. It also desirably has a high latent heat of vaporization such that its vapors carry a high level of heat content.

The presence of the secondary solvent which is relatively more volatile than the primary solvent in the selective solvent mixture enables the solvent stripping stage of the process to be operated at a correspondingly lower temperature than in its absence and enables the recovery of all or substantially all of the relatively polar feed stock components dissolved in the fat solvent by stripping therefrom with the secondary solvent vapors charged into and distilled from the stripping zone, the secondary solvent tending to increase the vapor pressure of the polar component dissolved in the fat solvent when the secondary solvent vapors are mixed with the fat solvent stream. The presence of the secondary solvent in the selective solvent mixture permits operation of the solvent stripping column at a lower temperature corresponding to the boiling point of the selective solvent mixture, thereby obviating the excessively high temperatures normally required to vaporize the dissolved relatively polar feed stock component from the fat solvent residue in the stripper column when stripping is dependent upon the boiling of the primary solvent comprising the stripper bottoms.

This invention provides a particularly desirable arrangement for operation of the solvent stripping zone of the process wherein the secondary solvent is removed as a relatively volatile fraction from the stripping zone, the stream of secondary solvent is vaporized by heat exchange with the fat solvent stream from the extraction zone or with the lean solvent stream from the reboiler section of the stripping column and the resulting vapors of secondary solvent in vapor form are continuously recycled, as separated, to the lower portion of the solvent stripping column wherein the vapors are mixed with the lean solvent residue in the bottom of the stripipng column. The reboiler coil vaporizes at least a portion of the secondary solvent from the stripper bottoms which, in vaporizing, carries along vapors of the polar compound of the feed stock mixture dissolved in the fat solvent residue. The mixed vapors comprising secondary solvent and extracted polar feed stock component are removed as volatile fractions from the stripping zone, condensed into liquids, the resulting liquid condensates separated, and the thus separated secondary solvent charged into heat exchange units for vaporization therein and subsequent recycling as hot vapor to the solvent stripping zone.

Compounds utilizable as the primary solvent constituent of the selective solvent composition are selected from the broad group characterized as oxygen-containing organic compounds selectively soluble with compounds of the feed stock mixture which have the greatest polarity and for hydrocarbons in the forepart of the series hereinabove described. Particularly suitable primary solvents are selected from the class of compounds characterized generally as oxygen-containing organic compounds, particularly the aliphatic and cyclic alcohols, the glycols and glycol ethers (also referred to as polyalkylene glycols) as well as the glycol esters and glycol ether-esters. Alkylene glycols and polyoxy-polyalkylene glycols which are especially effective as primary solvents in the present process include the mono-, di-, tri-, and tetra-oxy-poly-ethylene glycols, particularly oxy-diethylene glycol, the mono-, di-, and tri-oxy-propylene glycols and the mono-, di-, and tri-oxy-poly-butylene glycols; certain glycol ethers, such as the cellosolve series of compounds (defined structurally as the alkyl ethers of ethylene glycol), including methyl-, ethyl-, propyl-, and butyl-cellosolve; the carbitols (defined structurally as the alkyl ethers of diethylene glycol), such as methyl-, ethyl-, and butyl-carbitols; the glycol and polyoxyalkylene glycol esters of low molecular weight organic acids such as the acetates and propionates; the aliphatic alcohols, such as propanol, isopropanol, n-butanol, tert.-butanol, etc.; certain cyclic alcohols, such as cyclopentanol, cyclohexanol, cycloheptanol, etc.; and other oxygen-containing organic compounds such as phenol, resorcinol, pyrocatechol, etc.; various alkyl phenols, such as the ortho-, meta-, and para-cresols, thymol, etc.; the organic acid esters, particularly the fatty acid esters of aliphatic alcohols and especially the esters of relatively low molecular weight organic acids, such as the acetates, propionates, butyrates, and valerates, and other solvents of the general class hereinabove described and generally well known in the art. The preferred polyoxyalkylene glycols have the following empirical formula:

$$HO(C_nH_{2n}O)_xH$$

wherein $n$ has a value from 2 to 5 inclusive and $x$ has a value from 1 to 15 (preferably 2 to 4) when $n$ is 2, from 1 to 13 when $n$ is 3, from 1 to 12 when $n$ is 4 and from 1 to 10 when $n$ is 5. The primary solvent component of the present selective solvent mixture is a compound which of necessity when utilized in the present solvent extraction process employing a solvent stripping or vaporizing section must have a relatively high boiling point, exceeding at least the boiling point of the extracted compound, which, in the recovery of aromatic hydrocarbons from a gasoline boiling range petroleum fraction, is preferably above about 150° C.

The secondary solvent which is utilized in admixture with the primary solvent to reduce the solubility of the raffinate compounds present in the feed stock in the latter solvent and thus enhance the selectivity of the solvent mixture for the relatively polar component of the feed stock mixture to be recovered therefrom is a material which is preferably substantially immiscible with the compounds of the feed stock, although in some cases the solvent may consist of two compounds differing in their boiling points which are both relatively soluble with the components of the feed stock mixture to be recovered. The immiscibility of the secondary solvent with the feed stock components and its miscibility with the primary solvent constituent enables the secondary solvent constituent to be mixed with the effluent raffinate phase to remove by washing the normally small amount of primary solvent which tends to dissolve in the raffinate as it flows countercurrently through the selective solvent in the extraction column. In general, secondary solvents have the common characteristics of having a sufficient number of polar groups per molecule and a sufficiently high ratio of polar groups to methylene or methylidene groups per molecule to cause the compound to be only partially miscible or preferably substantially immiscible with the raffinate components of the feed stock. Typical normally liquid compounds having the above properties and which boil at a temperature substantially below the boiling point of the primary solvent and preferably at a temperature in the vicinity of ±50° C. of the boiling point of the polar feed stock component dissolved in the selective solvent are such materials as water, certain polyhydric alcohols such as inositol, certain polyhydroxy phenols, such as m,m'-dihydroxy phenol, certain polycarboxylic acid esters of short-chain alcohols such as dimethyloxalate, and other classes of polysubstituted polar compounds. The preferred secondary solvent utilized in admixture with the primary solvent for the recovery of feed stock components which boil at temperatures within close proximity of the secondary solvent is water, which may be present in the selective solvent mixture in an amount sufficient to yield a solution containing from 2 to about 75% by weight of water. When mixed with oxy-diethylene glycol to form the selective solvent mixture, the proportion of water is generally not less than about 2% nor more than about 35% by weight of the mixture, and preferably from about 5 to about 15% by weight thereof. For the oxy-polypropylene glycols, another class of useful primary solvents in the present separation and recovery process, the proportion of water in the solvent mixture is from about 8 to about 50% by weight of the solvent, and preferably from about 10 to about 40% by weight of the mixture. As the chain length of the alkylene group in the oxy-polyalkylene glycols increase, their selectivities decrease because the hydrocarbons of relatively low polarity, as well as other organic feed stock mixtures, become more soluble in the solvent. It thus becomes essential to increase the proportion of secondary solvent such as water in the selective solvent mixture to increase the selectivity of the extractant as the primary solvent becomes less selective.

In a special type of extraction procedure wherein all of a given class of materials are to be recovered from a particular feed stock mixture such as the recovery of all aromatic hydrocarbons contained in a mixed hydrocarbon feed stock, particularly when the latter is a mixture of compounds of relatively high boiling points, a mixture of two solvent constituents both of which are normally considered to belong to the class herein designated as primary solvents may be employed with effectiveness, provided that the differential in boiling points between the solvent constituents is sufficient to enable the more volatile solvent constituent to be readily vaporized from the other solvent constituent in the solvent stripping column and recycled to the lower portion of the latter column in order to effect stripping of the selectively dissolved, relatively polar component of the feed stock mixture from the fat solvent stream. The boiling point of the relatively more volatile secondary solvent constituent of the selective solvent mixture is desirably above the boiling point of the extracted component dissolved from the feed stock mixture and preferably has a greater latent heat of vaporization than the dissolved feed stock in order to provide more effective stripping of the latter component from the fat solvent stream in the stripping zone of the present process. Such a solvent combination is particularly desirable for the extraction and recovery of the components of the feed stock having a relatively high boiling point range, as for example, for the recovery of a high molecular weight aromatic hydrocarbon, such as a polycyclic or condensed ring aromatic hydrocarbon from a kerosene or gas oil fraction or from a lubricating oil fraction. As in the use of more volatile solvent mixtures, the relatively volatile solvent constituent of the selective solvent mixture is passed into the lower portion of the stripping column in vapor form and contacted with the fat solvent residue, thereby volatilizing the remaining feed stock component in the fat solvent by increasing the partial pressure of the latter component dissolved in the solvent residue. The increase in partial pressure of the residual dissolved polar component enables the recovery of substantially all of the latter component from the feed stock mixture and constitutes one of the principal advantages of the present invention. A suitable selective solvent mixture containing constituents having the above properties are such mixtures as ethylene glycol and oxy-diethylene glycol, propylene glycol and oxy-dipropylene glycol, ethylene glycol and propylene or oxy-dipropylene glycol, phenol and a higher boiling alkyl phenol such as one of the butyl phenols and numerous other examples of such solvent mixtures. Special advantages in selectivity and in adapting the process to large scale operations may be realized by employing a mixture of one or more species of the above named primary solvents with a secondary solvent, such as mixtures of oxy-diethylene glycol and oxy-dipropylene glycol with water; such mixtures are considered to be within the scope of the present invention.

Figure 1:
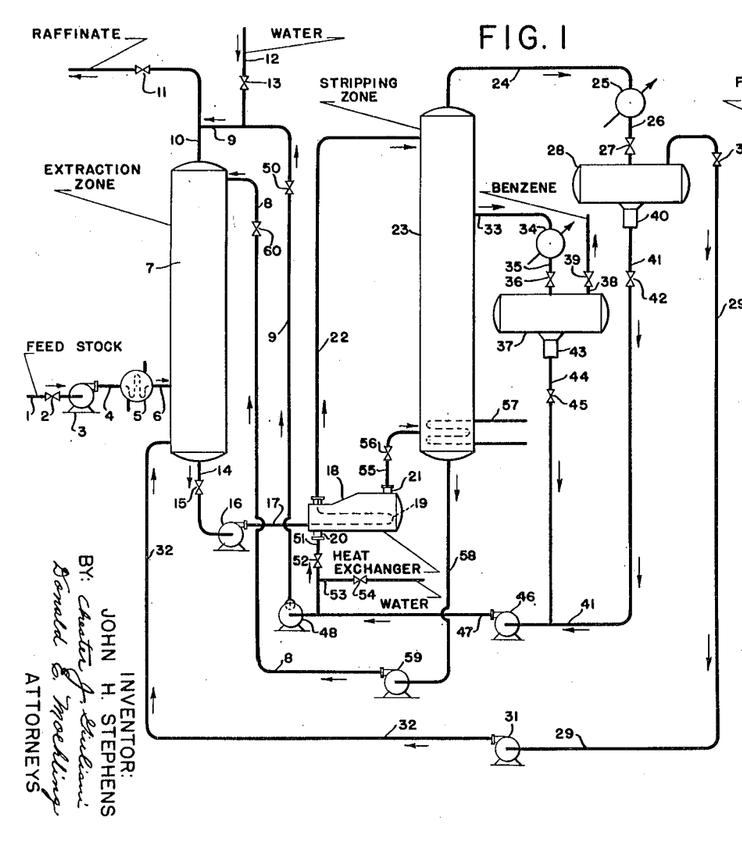

The invention is further described with reference to other embodiments and to provide a correlation of the principles upon which the present separation process operates in the accompanying diagram which represents a process flow typical of one of the preferred embodiments of this invention for the separation of a relatively polar organic compound from a mixture of the same with less polar components of a feed stock mixture, which for the purpose of simplicity is described with reference to a petroleum fraction containing one or more of the relatively polar aromatic hydrocarbons. A useful feed stock of this type is the product of a hydroforming process containing benzene and paraffinic and/or naphthenic hydrocarbons in admixture therewith, although other aromatic hydrocarbon-containing mixtures, including olefinic and cycloolefinic hydrocarbons may also be utilized as feed stock. A particularly suitable solvent for the recovery of the aromatic components of a hydrocarbon feed stock mixture is an oxy-diethylene glycol-water mixture containing preferably from about 5 to about 15% by weight of water, one of the preferred combinations of primary and secondary solvents utilizable in the present process. When the desired product of the process is a specific selective hydrocarbon such as benzene, to be recovered in substantially pure condition, a suitable fraction of the initial hydrocarbon distillate is separated which boils within such limits as to eliminate other aromatic hydrocarbons boiling above or below the desired product; thus, for the recovery of benzene, a petroleum distillate is selected which boils over a temperature range somewhat below the initial boiling point of the toluene azeotropes, and preferably having upper and lower boiling limits corresponding to the upper and lower temperature limits of the boiling range of the benzene azeotropes, which in the case of a paraffinic petroleum fraction is from about 70° to about 80° C. A particularly preferred feed stock mixture to the extraction column in a process for the recovery of benzene, which fraction excludes other non-aromatic components of the feed stock from the final extract product, is a closely fractionated distillate boiling from about 68° to about 80° C., said fraction containing all of the benzene in a given wider boiling range fraction, including its azeotropes. When the object of the process is to remove all of the aromatic components from a given liquid fraction of hydrocarbons, such as a hydroformed gasoline distillate, or to remove sulfur-containing components of a petroleum fraction, for example, the entire fraction may be charged to the process, as desired. Referring to the accompanying flow diagram representing a process for the recovery of benzene from a closely fractionated cut of a hydroformed gasoline, such as the aforementioned 68–80° C. fraction, the latter fraction is charged into the process flow from storage through line 1 containing valve 2 and pumped into the process flow by means of pump 3 which increases the pressure in the system, preferably to a superatmospheric value of from about 0.5 to about 20 atmospheres, a pressure level sufficient to maintain substantially liquid phase conditions for operation of the extraction stage under liquid-liquid phase contact conditions, although liquid-gas phase operation of the extraction column is also feasible without departure from the essential operating features of the process. The feed stock mixture at the above pressure is thereafter passed through line 4 into furnace 5 wherein the fraction is heated to a temperature above the boiling point of the secondary solvent constituent at the pressure maintained in the subsequent stripping zone, which in the case of water is preferably from about 100° to about 150° C., preferably from about 125° to about 140° C., although higher temperatures may be employed for other feed stock mixtures and for other selective solvents suitable to such recovery operations. In general, the solvent and feed stock streams are desirably heated to approximately the same temperature, the latter depending upon the feed stock and solvent mixture employed and particularly upon the pressures maintained in the extraction and stripping zones of the process. For example, temperatures as high as 350° to 400° C. may be utilized for the recovery of higher boiling polynuclear aromatic hydrocarbons from a kerosene or gas oil feed stock.

The hydrocarbon feed stock in liquid phase at the above indicated pressure and temperature conditions is charged through line 6 from furnace 5 into countercurrent extraction zone 7, illustrated as a vertical column, at an intermediate point thereof between the respective extract and raffinate outlet ports. When the process is operated under such conditions that a reflux stream is introduced into the column in its lowermost portion to displace raffinate components from the fat solvent stream, as hereinafter described, the feed stock is desirably introduced into the approximate center section of the column in order to provide sufficient countercurrent contact between the respective streams entering the column. The feed stock introduced into extraction zone 7 is contacted within the column with an aqueous solution of oxy-diethylene glycol containing from about 5 to about 15% by weight of water, the glycol constituent of the selective solvent composition being introduced into the column through line 8 as recycled lean solvent at the approximate upper extremity of the column. Extraction zone 7 is a suitable arrangement of conventional liquid-liquid extraction equipment designed to intimately contact and mix the liquids at least partially immiscible with each other preferably, by countercurrent flow therethrough, and may be a packed tower containing a packing with large superficial area such as berl saddles, quartz chips, etc., a sieve-deck column, or a bubble plate column of conventional design and fabrication.

The hydrocarbon feed stock at its point of entry into extraction column 7 is of considerably lower density than the relatively higher specific gravity oxy-diethylene glycol solvent admitted into the upper portion of the column and flows upwardly through the downwardly flowing stream of solvent-extract when the two substantially immiscible liquids are introduced into column 7 through their respective inlet ports. Since the aqueous diethylene glycol solvent selectively dissolves the benzene component of the feed stock, relative to the other hydrocarbons of the feed stock mixture, the benzene tends to dissolve in the solvent phase, leaving an essentially insoluble raffinate hydrocarbon phase relatively lean in benzene and consisting principally of paraffins, olefins and naphthenes present in the feed stock mixture. The raffinate becomes progressively richer in aliphatic and naphthenic hydrocarbons and relatively lean in benzene as it flows upwardly through the column in contact with the aqueous glycol extractant. The raffinate phase comprising hydrocarbons substantially insoluble in the solvent nevertheless contains a minor proportion of dissolved solvent, which although small in absolute amount, nevertheless when continuously removed from the process flow, represents a substantial loss in large scale operation if not recovered from the effluent raffinate stream. In order to recover the small amount of dissolved solvent from the raffinate hydrocarbons, the water required in the system to adjust the water content of the solvent to its desired selective composition, in an amount sufficient to provide a mixed water-oxydiethylene glycol solvent containing from about 2 to about 35% by weight of water, and preferably from about 5 to about 15% by weight of water, may be introduced into column 7 at a point above the port of entry of the recycled lean solvent mixture, such that the effluent raffinate stream is washed with water prior to removal of the raffinate from the process flow and beyond the point at which the raffinate stream last contacts the solvent introduced into the column. The water thus introduced into the flow readily dissolves and extracts the glycol from the raffinate hydrocarbons and recovers the sovent for recycling in the system.

The water introduced into the flow for this purpose may be mixed with the raffinate in a mixing vessel beyond the extraction zone or may be charged into the process through line 9 which joins the raffinate effluent conduit 10 containing valve 11, thereby countercurrently washing the raffinate stream within the conduit itself prior to removal of the raffinate to storage. Line 10 may contain mixing and settling vessels connected in series therewith to effect the raffinate washing more efficiently. The amount of water required for adjusting the water content of the solvent to its selective composition may be a portion of the water recovered from subsequent stages of the operation as hereinafter described or may be introduced from water make-up in controlled amounts, generally not more than the amount required to replace water losses from the system, through line 12 in an amount controlled by valve 13. The water flows downwardly in line 10 countercurrent to the rising stream of raffinate and eventually enters the top of extraction column 7 where it joins the recycled glycol solvent mixture introduced into the column through line 8, mixing therewith to form the selective aqueous glycol solvent provided herein. By maintaining the recycle rates of lean solvent and water at a substantially constant value and by further controlling the amount of fresh make-up water added to the system at a quantity sufficient to replace merely water lost from the flow, the water content of the selective solvent is maintained at its critical value of from about 2 to about 35% by weight thereof and preferably from about 5 to about 15% by weight of water.

The flow rate of selective solvent to the extraction column relative to the feed stock charging rate is mutually dependent upon a number of other factors existing within the system and particularly upon the desired purity of the ultimate benzene product to be recovered. Thus, a feed stock containing a relatively low concentration of the desired components, such as benzene, will permit a lower solvent charging rate, although the latter may be maintained at a high rate even in the event the charging stock contains a low concentration of the desired component in order to recover substantially all of the latter component from the feed stock or to recover it in a high state of purity. The feed stock charging rate may also be maintained at a lower value when the selectivity of the solvent is increased by the incorporation of a greater proportion of the secondary solvent constituent therein, as in the case of water in an aqueous diethylene glycol solution. In general, suitable ratios of selective solvent to feed stock mixtures charged to the solvent extraction column may vary from about 0.5 to 1 to about 30 to 1, or higher, preferably from about 5 to 1 to about 20 to 1 volume proportions thereof, depending upon the variables hereinabove noted.

The relatively dense extract or fat solvent stream from the extraction zone, comprising the selective solvent and containing dissolved therein a major proportion of the benzene component to be recovered in the process is removed from the bottom of extraction column 7 through line 14 containing valve 15 and is transferred by means of pump 16 and discharge line 17 into heat exchanger 18. The hot fat solvent stream formed in the extraction zone under the high temperature conditions at which the present extraction stage is desirably operated is passed in indirect heat exchange relationship with the water recycled to the stripping zone as the stripping agent therein, the hot extract vaporizing the water in the heat exchanger into steam of greater heat content. The method of heat exchange thereby provided wherein the hot fat solvent is passed in indirect heat exchange relationship with the secondary solvent comprises one of the alternative, although the preferred method provided in this invention for recovery of heat from the solvent stream. In releasing a portion of its sensible heat to the water stream recycled to the solvent stripping column to convert the water into steam for stripping residual benzene from the solvent stripper bottoms, the temperature of the fat solvent stream is reduced only to the level at which the heat content of the stream is still sufficient to effect flash vaporization of at least a portion of the light hydrocarbon components and at least a portion of the water contained in the fat solvent stream at the operating pressure maintained in the stripping column. By limiting the quantity of water entering the heat exchanger to that quantity previously vaporized from the fat solvent in the stripping column and by maintaining the temperature and pressure conditions in the column at a constant level over a continued period of operation, the reduction in heat content of the fat solvent stream prior to its introduction into the stripping column is limited to the amount of heat required to vaporize the water recycled to the stripping column and any hydrocarbons in the fat solvent stream vaporized from the stripping zone. In effect, the heat exchange operation removes sensible heat from the fat solvent stream and re-introduces the recovered heat into the bottom of the stripping column where it accomplishes the desired vaporization of the residual dissolved benzene in the fat solvent stripper bottoms, thereby proportionately relieving the reboiler of the required heating duty to effect the same stripping result; the method thereby results in an overall economy in the operation of the process.

In utilizing the excess heat in the fat solvent stream to vaporize the water recycled to the stripping column the temperature of the fat solvent is reduced from the relatively high level maintained in the extraction zone which is generally required to be operated at such higher temperatures in order to obtain the selective extraction of only the benzene component from the mixed hydrocarbon feed stock with the aforementioned glycol-water solvent maintained at its selective composition by the presence of the water constituent therein. The heat exchange operation thus provides a means for removing otherwise excessive heat from the solvent stream and re-introducing the vaporized water at a higher sensible heat level and containing latent heat of vaporization into the stripping zone wherein the latent heat of vaporization is released to the stripper bottoms to vaporize the residue of benzene dissolved therein. The fat solvent stream thereafter removed from the heat exchanger at a lower temperature level is charged into the top of the stripping zone where the heat retained in the fat solvent is sufficient to vaporize a major proportion of the volatile dissolved paraffin, benzene and water components of the fat solvent without imposing an excessive reflux burden on the stripping column. The latter reflux duty would otherwise necessitate recycling of the condensed water and benzene overhead to the top of the stripping column to remove excess heat in the fat solvent stream, above that required to vaporize the overhead of volatile components from the stripping column.

Referring again to Figure 1 of the accompanying diagram, the fat solvent stream at a superatmospheric pressure and at a relatively high temperature is circulated through a series of heat exchange coils such as coil 19 contained in heat exchanger 18 which is immersed in or surrounded by water preferably recovered as the flashed volatile overhead from the stripping column as hereinafter more fully described. Heat exchanger 18 comprises an enclosed chamber with inlet and outlet ports connecting with conduits leading to and from the unit through which the high temperature fat solvent stream is circulated. The heat exchanger coils such as coil 19 may be corrugated or finned to increase the surface of the heat exchange coils, thus increasing the net heat exchange between the hot, fat solvent circulated within the tube and the water surrounding the outside of the tubes. The external housing of the chamber contains an inlet port 20 at the bottom of the housing through which make-up water or the water from the stripping column is introduced and a steam outlet port 21 at the top of the housing through which the steam utilized for stripping is removed from the heat exchanger. The fat solvent effluent at a generally lower temperature level after circulation through the heat exchanger tubes is removed therefrom through line 22 and charged into the top of solvent stripping column 23.

This column, essentially a flash chamber in its uppermost portion and a distillation column below the flash chamber section, is preferably designed to operate at a somewhat lower pressure than extraction column 7, usually at substantially atmospheric pressure when extraction zone 7 is operated at a superatmospheric pressure in order to effect vaporization of at least a portion of the components of the fat solvent more volatile than the diethylene glycol primary solvent. The pressure differential between extraction column 7 and stripping column 23 is adjusted to obtain flash distillation of preferably all of the non-benzene hydrocarbon components of the fat solvent stream into the light vapor overhead, such that the fat solvent residue flowing into the distillation section of column 23 is substantially free of non-benzene hydrocarbons. This adjustment in the pressure differential is dependent upon the particular feed stock composition and other operating conditions under which the process is operated. In the process as described, the more volatile components of the fat solvent stream comprising a portion of the extracted benzene and the paraffin and naphthenic components of the feed stock dissolved in the glycol solvent are therefore flashed from the fat solvent at the temperature and pressure existing within column 23. These light vapors resulting from the initial flashing are removed through vapor overhead line 24. The vapors also contain a portion of the water present in the fat solvent stream which has an appreciable vapor pressure and volatilizes at the temperature and presure conditions maintained in column 23. At least a portion of the steam recycled to column 23 as the benezene stripping agent and the steam volatilized from the stripping agent and the steam volatilized from the stripper bottoms in the reboiling section of the column may also constitute a portion of the overhead vapor stream. The vapor overhead removed from column 23 through line 24 enters condenser 25 operating at a temperature sufficiently cool to condense the benzene, paraffins, naphthenes, and water vapor therein. The resulting liquid condensate is removed from condenser 25 through line 26 containing valve 27 and discharged into receiver vessel 28 wherein the liquid condensate is allowed to accumulate and the hydrocarbon and water phases, mutually immiscible in liquid form, allowed to stratify for subsequent separation by decantation. The upper benzene-paraffin-containing hydrocarbon layer accumulating in receiver vessel 28 is removed therefrom through line 29 extending into the upper hydrocarbon layer accumulating within the receiver vessel in controlled amounts determined by valve 30 and is, in accordance with the preferred method of operating the present process, recycled by means of pump 31 and conduit 32 to the bottom of extraction zone 7 to recover the benzene component therefrom. Recycle of the benzene-paraffin light overhead fraction to the bottom of the extraction zone results in further advantages in that the recycled benzene displaces at least an equivalent volume of paraffinic and naphthenic hydrocarbons which tend to dissolve in the solvent and which are otherwise present in the fat solvent stream as it is withdrawn from the extraction zone. The physical displacement of the less preferentially dissolved paraffins and naphthenes from the fat solvent stream with preferentially dissolved benzene substantially reduces the quantity of undesirable non-benzene components in this stream and facilitates the separation of the desired benzene product in the stripping zone. The paraffins and naphthenes recycled with the benzene in the light overhead fraction from stripping zone 23 join the raffinate phase in extraction column 7 and are ultimately withdrawn in the raffinate stream from the process flow. As indicated, return conduit 32 discharges the benzene-paraffin reflux into the bottom portion of extraction column 7, and preferably into the column at its lower extremity, at a point immediately above the fat solvent outlet port of the column in order to permit maximum countercurrent contact of the benzene reflux stream with the fat solvent stream prior to removal of the later from extraction zone 7. The reflux of the benzene component of the light overhead into column 7 essentially reduces the quantity of paraffins it is necessary to flash from the fat solvent stream in stripping zone 23 in order to form a fat solvent residue free of non-benzene hydrocarbons and reduces the cooling duty of condenser 25.

The fat solvent residue formed in stripping column 23 as a result of the flash distillation of the paraffinic and naphthenic components dissolved in the fat solvent in the upper section of the column is substantially enriched in dissolved benzene and flows downwardly in column 23 into the distillation section thereof where the disolved benzene component is distilled from the solvent by heat from the reboiler and the hot recycle stripping stream introduced into the column. The resulting vapors of steam and benzene substantially free of non-benzene hydrocarbons are removed from column 23 as a side stream cut through line 33, the vapors being cooled sufficiently in condenser 34 to condense the benzene and water components into liquid condensates. The latter are removed from condenser 34 through line 35 and valve 36 and allowed to accumulate and stratify in receiver vessel 37. The upper benzene layer is withdrawn through line 38 and valve 39 to storage as the final product of the process. The product represents substantially all of the benzene present in the original feed stock and is recovered in a concentrated form at least of nitration grade quality with respect to benzene purity.

The liquid receivers attached to the flash vapor overhead condenser 25 and to the benzene side stream condenser 34 each contain a lower layer of condensed water which accumulates below the upper hydrocarbon layers in the respective receiver vessels 28 and 37. The aqueous layer in receiver vessel 28 flows into settling leg 40 and is withdrawn therefrom through line 41 in amounts not exceeding the retention of a two-layer system in vessel 28 as controlled by valve 42. The lower aqueous phase accumulating in receiver vessel 37 is removed from settling leg 43, attached to the receiver vessel, through line 44 and valve 45, line 44 connecting with line 41 which recycles the water condensate from the respective vapor lines into the process flow. For this purpose, pump 46 transfers the liquid water into conduit 47 from which separate portions are removed in controlled amounts to accomplish the present separation. A portion of either or both the water or benzene condensates may be returned to the top of the stripping column in accordance with well-known fractionation procedures to act as reflux therein, by return conduits not shown on the accompanying diagram.

A portion of the water overhead condensate from the stripping column may be withdrawn from line 47 to rehydrate the oxy-diethylene glycol solvent, if necessary, to its selective composition for solvent extraction in column 7, although the amount of water for this purpose is generally small or substantially nil when operating the process in accordance with the present description. If required, the water for this purpose is removed from line 47 by means of pump 48 which discharges the water into line 9 in an amount controlled by valve 50 for mixing with the lean solvent stripper bottoms recycled into the top of extraction column 7 as hereinafter described.

The water supplied to heat exchanger 18 to be converted into steam which is subsequently recycled to the stripping column is preferably withdrawn from line 47 through conduit 51 in an amount controlled by valve 52 and in a quantity sufficient to supply the required volume of steam for stripping purposes in column 23, although the water for this purpose may also be supplied from extraneous sources outside of the process flow, for example, from water make-up charged into the flow through line 53 in amounts controlled by valve 54. The steam thus formed is removed from heat exchanger 18 through steam outlet port 21 and line 55 containing valve 56 which controls the amount of steam introduced into the bottom of solvent stripping column 23. The inlet point for the stripping steam is desirably at or near the bottom of column 23, although the steam may also be introduced into one or more intermediate points along the height of column 23. The preferred method of operation comprises introducing the stripping steam into the reboiling section of the column wherein it contacts the hot, lean glycol solvent surrounding the reboiler coil, converting the latter into a high temperature vapor which effects substantially complete removal of benzene from the stripper bottoms. The reboiling section of the column contains a reboiler coil 57 through which hot gases or a heated liquid is circulated, the heating medium giving up its heat to the stripper bottoms. The temperature of the fluid circulated through reboiler coil 57 is desirably at substantially the same or at a somewhat higher temperature than the temperature at which the extraction column is operated, such that the lean ethylene glycol solvent removed from the bottom of the column is approximately at the temperature employed in the solvent extraction zone. Thus, when the lean, recycled solvent is mixed with the recirculated water (generally in relatively small amount) in the upper section of extraction column 7 to form the selective solvent composition, the final temperature of the resulting solvent composition is approximately the desired operating temperature of the extraction zone.

The lean glycol, substantially free of benzene and containing approximately the desired quantity of water to provide the present selective solvent composition accumulating in the bottom of stripping column 23 is removed therefrom through line 58 and transferred by means of pump 59 into lean solvent recycle line 8 in controlled amounts as determined by valve 60. When operating the process under equilibrium conditions, and when introducing the steam stripping agent into the lower portion of the stripping column in contact with the lean solvent bottoms, the quantity of water in the glycol solvent remains substantially constant throughout the system. Furthermore, both the glycol and water streams may be recycled continuously between the stripping and extraction zones without additional make-up of these solvent constituents being required to supplement the initial charge of these materials into the process.

Figure 2:
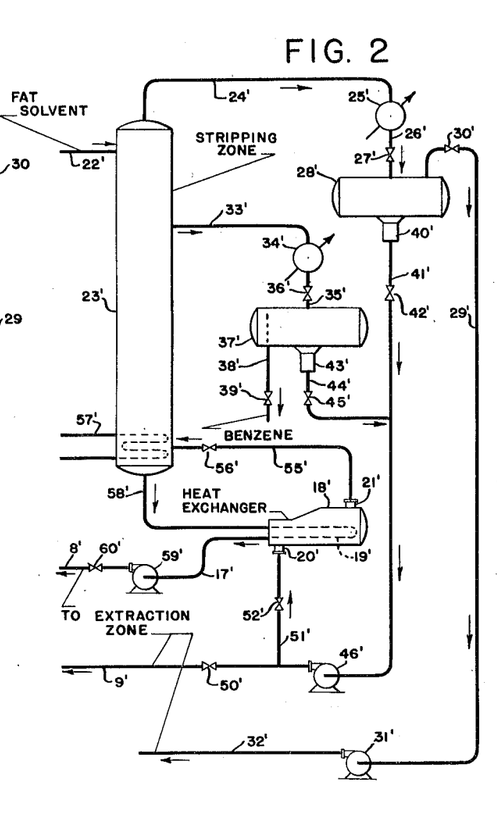

In accordance with another, alternative embodiment of the present method of operation for the recovery of heat from the solvent stream utilized in the process, the water vaporized from the fat solvent as a component of the light vapor overhead and benzene fractions from the solvent stripping column is converted to steam by heat exchange of the water stream with the hot lean solvent stripper bottoms removed from the lower portion of the stripping column. In this method of operation the sensible heat contained in the lean glycol stripper bottoms is utilized to vaporize the recycled water into steam of greater heat content which is thereafter charged into the solvent stripping column where it operates as the stripping agent for removal of the residue of extracted benzene dissolved in the fat solvent stream. The latter alternative operation of the process is shown in Figure 2 of the accompanying diagram which illustrates the essential features of the latter alternative embodiment of the present invention, the fat solvent stream charged into the stripping column being the extract stream recovered from an aqueous glycol extraction column, as in the operation of the process hereinabove described for Figure 1. The fat solvent is charged into stripping column 23' through line 22', column 23' being operated at a lower pressure (preferably at substantially atmospheric pressure) than the solvent extraction column. The light overhead vapors comprising a mixture of vaporized water, benzene, and non-benzene hydrocarbons present in the feed stock and dissolved in the selective solvent is flashed from column 23' into vapor overhead line 24', condensed to a liquid distillate fraction in condenser 25' and the liquid condensate discharged into liquid receiver vessel 28' through line 26' and valve 27'. The liquid hydrocarbon condensate accumulating as an upper layer in receiver vessel 28' is removed therefrom through line 29' which extends into the upper layer in receiver vessel 28'. These hydrocarbons are recycled in controlled amounts through valve 30' by means of pump 31' to the lower portion of extraction column 7 as described for Figure 1, above, in the similar recycling of the light vapor overhead fraction. Benzene and water vapors which are distilled from the fat solvent in stripping zone 23' are removed as a side-cut fraction through line 33', liquefied in condenser 34', the liquid condensate charged into receiver vessel 37' through line 35' and valve 36' and separated therein by layer separation. Substantially pure benzene is removed from vessel 27' through line 38' and valve 39' as the product of the process.

The aqueous layers separating in receiver vessels 28' and 37' and accumulating in their respective settling legs 40' and 43' are removed through lines 41' and 44' respectively, containing valves 42' and 45' respectively, combined in line 41' and transferred by means of pump 46' into the recycling conduits of the apparatus provided in the present alternative flow arrangement. The portion of the combined water condensates recovered from stripping column 23' required to make up the glycol solvent to its selective composition for use in the extraction zone is withdrawn through line 9' in controlled amounts determined by valve 50' for recycling to the top of the extraction column in a manner similar to the process represented by Figure 1.

Another portion of the water distilled from the fat solvent in stripping column 23' is withdrawn from line 9' through line 51' and valve 52' in an amount required to effect the present stripping operation, the water being discharged into heat exchange unit 18' through water inlet port 20'. The heat exchange unit is similar in design to unit 18 described in Figure 1 and contains heat exchange coil 19' through which the hot glycol stripper bottoms from column 23' is circulated. The solvent stripper bottoms comprising lean glycol solvent from which the extracted benzene has been removed by heating of the fat solvent residue in column 23' with reboiler coil 57' is removed from the latter column through line 58'. The lean solvent is circulated through heat exchange tubes such as 19' in heat exchange unit 18' and is thereafter recycled to the top of the extraction column, not shown, through line 17' by means of pump 59' and line 8' containing valve 60'.

The steam formed by heat exchange of the recycled water stream from solvent stripping column 23' in heat exchange unit 18' is withdrawn from the latter unit through steam outlet port 21' and line 55' in controlled amounts determined by valve 56' and discharged into the lower portion of stripping column 23' wherein the steam acts in the capacity of the steam stripping agent in a manner similar to the steam utilized as stripping agent in the description of Figure 1.

Although the alternative heat exchange operation described above with reference to Figure 2 effects a substantial saving in the amount of heat necessary to effect recovery of the extracted aromatic hydrocarbons from the fat solvent stream by the expedient of recovering the excess heat contained in the hot, lean solvent stream or stripper bottoms, the operation thereby provided is somewhat less efficient than the preferred method of operation described with reference to Figure 1 above, wherein the hot, fat solvent stream from the extraction zone is passed in indirect heat exchange relationship with the recycled water stripping agent. In either method of heat recovery, however, a substantial saving in heating utilities is effected without any sacrifice in operating efficiency or yield of recovered product. Depending upon the nature of the organic feed stock mixture to be extracted, the reduction in the amount of heat required for the process when utilizing the present improved heat exchange operation may be as much as 65% of the number of heat units required for an extraction process in which the present heat exchange operation is omitted.

The present process is particularly adapted to the recovery of a substantially pure organic polar compound from a feed stock mixture thereof with less polar compounds, such as the recovery of nitration grade benzene and/or toluene (containing 99.5+% benzene and/or toluene), by the expedient of recycling the light vapor overhead containing a portion of the polar feed stock component from the stripping zone to the bottom of the extraction zone, and separating the substantially pure polar feed stock component as a side-cut stream from the stripping zone; however, it is also within contemplation of the present invention to operate the stripping zone for the production of a less selective product by flash vaporization of all of the light hydrocarbon components from the fat solvent stream in the initial flashing operation, thereby, omitting the recycling of a reflux stream to the bottom of the extraction zone, said stream comprising the non-polar feed stock components dissolved in the fat solvent stream, together with a portion of the polar feed stock component flashed from the stripping zone. The latter non-selective method of operation is productive of a generally inferior product from the standpoint of purity, although it is produced with less process equipment and less consumption of heating and cooling utilities.

The invention is further described with reference to specific embodiments thereof in the following illustrative examples, which, however, are not intended to restrict the generally broad scope of the invention in accordance with the variables stated therein.

*Example I*

A mixture of benzene, toluene and xylene may be recovered from a petroleum-derived hydrocarbon fraction containing the above aromatic hydrocarbons and other types of hydrocarbons such as paraffinic, olefinic and naphthenic hydrocarbons in admixture therewith. In the following operation, a hydrocarbon mixture comprising a gasoline boiling range fraction recovered from the normally liquid products of a catalytic reforming conversion process is subjected to countercurrent solvent extraction utilizing an aqueous oxy-diethylene glycol selective solvent containing about 8% by weight of water. In the preparation of the hydrocarbon feed stock, a straight-run gasoline fraction boiling from 150° to about 270° F. (65–132° C.) is passed at hydroforming reaction conditions over a suitable hydroforming catalyst. The products of the hydroforming conversion reaction are separated into a liquid fraction having an initial boiling point of about 65° C. and having an end boiling point of about 310° F. (154.4° C.), said fraction containing approximately 7.0% benzene, 25.6% toluene and 30.6% by weight of xylene. The latter, normally liquid fraction of the reformed straight-run gasoline is passed at the rate of 1,635 bbls./day at a pressure of 60 lbs./in.$^2$ and at a temperature of 260° F. into the lower portion of a vertical countercurrent extraction column containing about 60 actual plates which represent from about 15 to about 20 theoretical plates. As the feed stock mixture is charged into the extraction column, an aqueous diethylene glycol solution containing approximately 8% water and being the lean solvent stream recovered from the stripping stage of the present extraction process together with raffinate wash water, as hereinafter described, is charged at the rate of 24,780 bbls./day at a temperature of 260° F. and at a pressure of 60 lbs./in.$^2$ into the top of the extraction column and allowed to percolate downwardly through the column against a rising stream of the hydrocarbon feed stock charged into the lower portion of the column. Still another stream which enters the extraction column in its lower portion, below the extraction section is a mixture of paraffinic and aromatic hydrocarbons containing approximately 26% by volume of combined benzene, toluene and xylene which is recovered from the subsequent stripping column hereinafter described, as a light overhead vapor fraction. This stream acting as a reflux to displace at least a portion of the paraffinic components of the feed stock which tend to dissolve in the selective solvent is charged into the bottom of the extraction column at a rate of 2,102 bbls./day at a pressure of 60 lbs./in.$^2$ and at a temperature of 260° F.

A fat solvent stream comprising the aqueous oxy-diethylene glycol solvent containing dissolved therein the aromatic hydrocarbon components of the feed stock mixture is removed from the bottom of the extraction column and is charged at the temperature and pressure maintained within the extraction column into a solvent stripping zone comprising a flashing section maintained at about 20 lbs./in.$^2$ pressure on the upper plate and a fractional distillation section below the uppermost plate which is operated at substantially atmospheric pressure. A light overhead vapor is flashed from the fat solvent stream and is lead into a water-cooled condenser having attached thereto a receiver vessel for accumulation of condensed liquid overhead therein. Under the conditions of operation specified above, approximately 14,270,000 B. t. u./hr. are removed from the light vapor overhead by the condenser cooling water. The liquid condensate collecting in the receiver vessel separates into two phases, an upper layer comprising a mixture of aromatic hydrocarbons containing approximately 26 volume percent of mixed benzene, toluene and xylene and the remainder paraffinic hydrocarbons and a lower aqueous phase. The upper, aromatic-paraffin hydrocarbon layer accumulating in the overhead vapor receiver is divided into two streams, one stream in the amount of 3,400 bbls./day is recycled to the top of the stripping column for refluxing purposes. A second stream of these hydrocarbons is withdrawn at a rate of 2,102 bbls./day and is charged into the bottom of the extraction column as the reflux stream hereinbefore referred to. The lower aqueous layer in the amount of 242 bbls./day is reserved for subsequent use as the stripping agent. A side-cut fraction removed from an intermediate plate of the solvent stripping column comprises a mixture of benzene, toluene, xylene and water vapors. The vapors are liquefied at atmospheric pressure in a water-cooled condenser, the liquid condensate being collected in a receiver vessel attached to the condenser. A lower aqueous phase is withdrawn from the receiver in the amount of 387 bbls./day and combined with the aqueous stream recovered from the light overhead vapor fraction, the 629 bbls./day of combined aqueous streams being passed into a heat exchanger wherein the water is vaporized into steam at a temperature of 225° F. and passed into the bottom portion of the solvent stripping column to vaporize the aromatic hydrocarbon components which tend to remain dissolved in the stripper bottoms.

The upper, aromatic hydrocarbon layer accumulating in the side-cut receiver, in the amount of 869 bbls./day is removed to a storage vessel for subsequent fractionation into its benzene, toluene and xylene components. The condenser duty for the aromatic side-cut stream is approximately 11,100,000 B. t. u./hr. The benzene-toluene-xylene concentrate contains less than 0.3% by weight of non-benzene hydrocarbons and may be fractionated by simple distillation into a benzene fraction boiling from 80.0 to 80.1° C., containing 99.9% benzene, a toluene fraction and a C$_8$ aromatic fraction. A reboiling coil in the bottom of the stripping column through which hot diphenyl oxide heating fluid is circulated heats the stripper bottoms to a temperature of 260° F. A total of 26,100,000 B. t. u./hr. are supplied to the reboiler coil for this purpose. A material balance of the process indicates that 99% of the benzene, 98% of the toluene and 85% of the xylene contained in the original feed stock mixture are recovered.

The lean solvent residue accumulating in the bottom portion of the stripping column in contact with the reboiler coil and containing approximately 8% by weight of water is removed therefrom and recycled to the top of the extraction column at the aforesaid rate of 24,780 bbls./day and at a temperature of 260° F.

The hydrocarbon raffinate stream comprising components of the original hydrocarbon feed stock mixture not extracted by the selective solvent solution is removed from the top of the extraction column at a rate of 766 bbls./day, is washed with 1,200 gallons/hr. of water to remove the small amount of dissolved selective solvent therefrom and diverted to storage. The raffinate contains less than 0.2% benzene, approximately 0.5% toluene, approximately 6% by weight of xylene. The aqueous washing stream separated from the raffinate is diverted into the top of the extraction column where it mixes with the oxy-diethylene glycol lean solvent recovered from the bottom of the stripping column.

Example II

In a similar operation utilizing the same solvent, the same hydrocarbon feed stock mixture, the same charging rates of solvent and feed stock and the same apparatus, except that the fat solvent stream removed from the bottom of the extraction column is passed through a multiple coil heat exchange unit in indirect heat exchange with the aqueous layer separating in the receiver vessel attached to the light vapor overhead condenser of the stripping column prior to discharge of the fat solvent stream into the stripping column. The heat exchanger comprises a horizontal tubular shell containing a bundle of multiple coils through which the hot, fat solvent is circulated, the water occupying the space between the hot coils and the shell housing of the heat exchanger. In the latter method of operation, the extraction column is operated at a temperature of 280° F. and the aromatic-paraffin hydrocarbons comprising the light overhead vapor fraction is omitted as reflux to the stripping column. Under the conditions thus provided, the 629 bbls./day of water vaporized from the fat solvent stream in the stripping column and removed therefrom as the light overhead vapor is converted entirely into steam at a temperature of about 235° F. which is charged into the bottom of the stripping column above the reboiler section. The total heat supplied to the reboiler coil in the stripping column under the latter modified procedure is 16,400,000 B. t. u./hr., the cooling duty on the water condenser for the light overhead vapor from the stripping column is approximately 7,950,000 B. t. u./hr., and the cooling duty on the water condenser for the aromatic side-cut fraction is 7,120,000 B. t. u./hr. The yield of recovered benzene, toluene and xylene concentrate is the same as in Example I, above, that is, in the amount of 869 bbls./day, containing less than 0.3% non-aromatic hydrocarbons.

Example III

In a similar type of operation as described in Example I, above, utilizing the same feed stock mixture, the same oxy-diethylene glycol solvent, the same charging rates of solvent and feed stock into the extraction unit and the same apparatus, except that the water layer separating from the aromatic hydrocarbon layer in the receiver vessel attached to the light overhead vapor condenser is passed into a heat exchange unit similar to that employed in Example II above in indirect heat exchange with the lean solvent residue or stripper bottoms of the stripping column. The reboiling coil in the bottom of the stripping column under the latter modified method of operation requires approximately 17,680,000 B. t. u./hr. and the temperature of the stripper bottoms removed from the stripping column is approximately 280° F., 8,320,000 B. t. u./hr. are removed from the light overhead vapor fraction from the solvent stripping column in the water cooled condenser therefor and 8,480,000 B. t. u./hr. are removed from the aromatic side-cut condenser. The yield of 869 bbls./day of benzene hydrocarbon concentrate in the purity indicated above for the product formed in Examples I and II above is obtained by means of the present process.

I claim as my invention:

1. In a solvent extraction process for the separation of an aromatic hydrocarbon from a mixture thereof with a non-aromatic hydrocarbon wherein said mixture is contacted in a solvent extraction zone with a selective solvent comprising a solution of primary and secondary solvent constituents to form a fat solvent stream and a raffinate stream, said primary solvent being soluble with and less volatile than said aromatic hydrocarbon and said secondary solvent boiling at a temperature below said primary solvent, the improvement in said process which comprises vaporizing dissolved aromatic hydrocarbon and secondary solvent from said fat solvent stream in a solvent stripping zone, thereby forming a lean solvent stream, recovering secondary solvent from the resulting vapors, passing at least a portion of the recovered secondary solvent in indirect heat exchange relationship with at least one of said aforementioned fat solvent and lean solvent streams to form thereby secondary solvent vapors of greater heat content, passing said secondary solvent vapors into the lower portion of said solvent stripping zone as a stripping medium for the removal of residual dissolved aromatic hydrocarbon from the lean primary solvent in the stripping zone, recovering from the stripping step a predominantly aromatic fraction and a fraction containing aromatic and non-aromatic hydrocarbons, and introducing the last-mentioned fraction into the lower portion of said extraction zone.

2. A process for the recovery of an aromatic hydrocarbon from a mixture thereof with at least one hydrocarbon of the series: olefinic, paraffinic and naphthenic hydrocarbons which comprises contacting in a solvent extraction zone said hydrocarbon mixture with a selective solvent comprising an aqueous solution of an organic solvent soluble with said aromatic hydrocarbon and having a boiling point greater than water, maintaining said extraction zone at a temperature above the boiling point of water and at a superatmospheric pressure sufficient to maintain said solvent in substantially liquid phase, removing a fat solvent stream comprising said selective solvent and said aromatic hydrocarbon dissolved therein from said extraction zone, passing said fat solvent stream into a heat exchanger in indirect heat exchange relationship with water supplied thereto in a quantity controlled to convert at least a portion of said water into steam, passing the fat solvent stream and said steam from said heat exchanger into a solvent stripping zone maintained at a pressure less than the pressure maintained in said extraction zone, vaporizing from the fat solvent stream in the stripping zone water, an aromatic hydrocarbon fraction and a fraction comprising substantially all of the non-aromatic hydrocarbons and a portion of the aromatic hydrocarbon dissolved in the solvent, recovering the first-mentioned fraction, and introducing the hydrocarbon components of the second-mentioned fraction into the lower portion of said extraction zone.

3. The process of claim 2 further characterized in that said water supplied to said heat exchanger comprises water vaporized from said fat solvent stream in the stripping zone.

References Cited in the file of this patent

UNITED STATES PATENTS

| | | |
|---|---|---|
| 2,009,079 | Burkhard | July 23, 1935 |
| 2,057,004 | Burkhard | Oct. 13, 1936 |
| 2,282,982 | Jewett | May 12, 1942 |
| 2,400,802 | Arnold | May 21, 1946 |
| 2,407,820 | Durrum | Sept. 17, 1946 |
| 2,444,582 | Smith | July 6, 1948 |
| 2,522,618 | Johnson et al. | Sept. 19, 1950 |
| 2,640,018 | Heath | May 26, 1953 |